(12) United States Patent
Kwun et al.

(10) Patent No.: US 7,532,911 B2
(45) Date of Patent: May 12, 2009

(54) RANDOM BEAMFORMING METHOD FOR A MIMO SYSTEM

(75) Inventors: Jong-Hyung Kwun, Seoul (KR); Chan-Soo Hwang, Yongin-si (KR); Eun-Yong Kim, Daejeon (KR); Joo-Hwan Chun, Daejeon (KR)

(73) Assignees: Samsung Electronics Co., Ltd (KR); Korea Advanced Institute of Science & Technology (KR)

( * ) Notice: Subject to any disclaimer, the term of this patent is extended or adjusted under 35 U.S.C. 154(b) by 434 days.

(21) Appl. No.: 11/392,433

(22) Filed: Mar. 29, 2006

(65) Prior Publication Data

US 2006/0238268 A1 Oct. 26, 2006

(30) Foreign Application Priority Data

Mar. 29, 2005 (KR) .................... 10-2005-0026138

(51) Int. Cl.
*H04M 1/00* (2006.01)
*H04B 1/16* (2006.01)
*H04B 1/10* (2006.01)

(52) U.S. Cl. .................... 455/562.1; 370/335; 370/295

(58) Field of Classification Search ................. 375/295, 375/260; 370/335
See application file for complete search history.

(56) References Cited

U.S. PATENT DOCUMENTS

2004/0042427 A1* 3/2004 Hottinen .................... 370/335
2004/0190643 A1* 9/2004 Liu et al. .................... 375/295

* cited by examiner

*Primary Examiner*—Lester Kincaid
*Assistant Examiner*—Charles Shedrick
(74) *Attorney, Agent, or Firm*—The Farrell Law Firm, PC

(57) ABSTRACT

A transmission method based on random beamforming. A base station receives, from mobile stations, feedback information including channel-by-channel transmission rates for a weight vector arbitrarily set by the base station. The base station compares transmission rates of identical channels received from the mobile stations. The base station allocates an associated channel to a mobile station with a large transmission rate and transmits a signal through the allocated channel. The transmission method based on random beamforming can improve fairness and efficiency of a resource allocation by simultaneously allocating different channels to multiple terminals and can increase a total system capacity through the improved fairness and efficiency.

7 Claims, 5 Drawing Sheets

RANDOM BEAMFORMING METHOD FOR A MIMO SYSTEM

PRIORITY

This application claims priority under 35 U.S.C. § 119 to an application entitled "Random Beamforming Method For A MIMO System" filed in the Korean Intellectual Property Office on Mar. 29, 2005 and assigned Ser. No. 2005-26138, the contents of which are incorporated herein by reference.

BACKGROUND OF THE INVENTION

1. Field of the Invention

The present invention generally relates to a Multiple-Input Multiple-Output (MIMO) system, and more particularly to a random beamforming method for the MIMO system.

2. Description of the Related Art

Next-generation mobile communication (4G) requires a significantly higher transmission rate than that of third-generation mobile communication (3G). To satisfy the required transmission rate, both a base station at a transmitting side and a terminal at a receiving side may utilize a Multiple-Input Multiple-Output (MIMO) system adopting multiple antennas.

The MIMO system is a communication system for transmitting and receiving data using multiple transmit and receive antennas, and divides a MIMO channel formed by the transmit and receive antennas into a plurality of independent spatial channels. Each spatial channel is mapped to one dimension. When additional dimensions generated by the multiple transmit and receive antennas are exploited, the performance of the MIMO system is further improved.

Using the MIMO system, data transmission schemes can be a Spatial Multiplexing (SM) scheme for transmitting data at a high rate without increasing a system bandwidth by simultaneously transmitting different data using multiple antennas at the transmitting and receiving sides and a Spatial Diversity (SD) scheme for transmitting identical data through multiple transmit antennas and obtaining a transmit diversity gain.

The MIMO transmission scheme can be divided into an open-loop scheme and a closed-loop scheme according to the use of channel gain information at the transmitting side. Because the transmitting side does not need channel information in the open-loop scheme, it can be easily implemented and does not perform a channel information feedback process. Open-loop transmission schemes include a well-known Space-Time Block Code (STBC) scheme, a spatial multiplexing scheme based on Vertical Bell Labs LAyered Space-Time (VBLAST) decoding, etc. On the other hand, the closed-loop scheme employs channel information fed back from the receiving side and provides better throughput if the channel information is correct. However, because an amount of channel information may increase to provide a feedback of the correct channel information, the amount of feedback information and the system throughput have a trade-off relation.

A random beamforming technique is a transmission scheme in which multi-user diversity and scheduling are combined. Theoretically assuming that an infinite number of users are present within a cell, the performance of complete closed-loop beamforming can be provided using only a small amount of feedback information.

In the random beamforming technique, the transmitting side does not need channel information and performs beamforming with a randomly generated weight. Receiving sides notify the transmitting side of their Signal to Interference plus Noise Ratios (SINRs) or allowable transmission rates based thereon using only a limited amount of feedback information. The transmitting side allocates a channel to the receiving side with the highest SINR (or transmission rate) in the current weight. Under a fast fading environment with fast channel variations, channels may be evenly allocated to many users. However, there is a problem in fairness if a weight is fixed under a slow fading environment with slow channel variations. In this case, if a weight can be newly changed to an arbitrary value at a short time interval, the effect of fast channel variations can be obtained and the fairness between multiple users can be improved. The beamforming technique can be exploited in combination with a scheduling algorithm such as proportional fairness scheduling that simultaneously considers efficiency and fairness by referring to an amount of currently received data, and first allocating a channel to a user with a small amount of received data rather than a user with a large amount of received data, as compared with a channel allocation method using only a momentarily varying SINR.

The beamforming technique is a method for obtaining a transmit diversity gain using multiple antennas at a transmitting side. Recently, research has been being conducted on the random beamforming technique for the MIMO system adopting multiple antennas also at a receiving side.

FIG. 1 schematically illustrates a structure of a communication system to which a multi-antenna random beamforming technique is applied. In FIG. 1, terminals also have at least two antennas, respectively. The conventional multi-antenna random beamforming technique aims at performance approximating that of Singular Value Decomposition (SVD) multiplexing capable of maximizing a channel capacity of a single-user MIMO system. For this, the multi-antenna random beamforming technique exploits both multi-user diversity and receive diversity on the basis of multiple antennas of the terminals.

In FIG. 1, a base station 101 generates an arbitrary weight vector $V_0$, multiplies $V_0$ by an input signal vector x, and transmits $V_0$ x through multiple transmit antennas.

Among a plurality of terminals 103, 105, and 107, an arbitrary k-th terminal receives a signal based on a channel matrix $H_k$. At this time, it is assumed that the terminal exactly knows the channel matrix. To exploit the well-known SVD multiplexing capable of obtaining a high channel capacity, SVD of the channel matrix $H_k$ is taken and a matrix $U_k$ configured by left singular vectors is computed and multiplied by the received signal. Thus, the received signal can be expressed as shown in Equation (1), where $n_k$ is the additive Gaussian noise vector.

$$r_k = U_k^H (H_k V_0 x + n_k) \qquad (1)$$
$$= U_k^H \left( U_k \sum_k V_k^H \right) V_0 x + U_k^H n_k$$
$$= \sum_k V_k^H V_0 x + U_k^H n_k$$

If the number of linked terminals is sufficiently large, the probability in which a terminal with $V_k$ significantly similar to $V_0$ is present increases. Due to $V_k^H V_0 \approx I$, the effect of SVD multiplexing can be obtained. In this case, the channel capacity can be further increased when a water-filling algorithm is applied.

The terminal computes SINRs of respective data symbols, performs conversion to a total transmission rate at which transmission is possible, and transmits information to the base station through a limited feedback channel. At this time, the total transmission rate is expressed as shown in Equation (2) where $\Gamma_{k_i}$ is an SINR of an i-th symbol $x_i$ computed in the k-th terminal.

$$C_k = \sum_i \log_2(1 + \Gamma_{ki}) \qquad (2)$$

The base station allocates all channels to an $$\underset{k}{\operatorname{argmax}} \{C_k\} - th$$

terminal and repeats the above-described procedure after a predetermined time elapses.

However, if the number of linked terminals in a cell is infinite in the conventional random beamforming method, a terminal with $V_k$ close to $V_0$ is present because it is difficult that $V_k$ and $V_0$ exactly match in a limited number of users, $V_k^{"}V_0 \neq I$. That is, self-interference occurs when x is recovered. Assuming that every terminal uses two receive antenna, x will be a 2×1 vector. At this time, the SINR of $x_1$ is given as shown in Equation (3).

$$\Gamma_{k_1} = \frac{[\sum_k 1]^2 |[V_k^H V_0]_{11}|^2 E_s}{[\sum_k 1]^2 |[V_k^H V_0]_{12}|^2 E_s + N_0} \qquad (3)$$

In Equation (3), $E_s$ is the average symbol energy of x and $N_o$ is the noise spectral density.

Because $[\Sigma_k]_{11}{}^2|[V_k^{"}V_0]_{12}|^2 E_s$ of Equation (3) acts as interference, performance degradation occurs.

Because the conventional random beamforming method must allocate all independent channels to one terminal, the probability in which one arbitrary terminal with the best combination of channels is present is very low when good and bad channels are evenly mixed for every terminal. Thus, it may not be expected that the base station can always transmit data at the best transmission rate. The base station needs to improve transmission efficiency by dividing and allocating channels for multiple users.

SUMMARY OF THE INVENTION

It is, therefore, an object of the present invention to provide a random beamforming method that can improve system throughput by removing self-interference occurring at the time of using a conventional random beamforming scheme.

It is another object of the present invention to provide a random beamforming method that can improve fairness and efficiency of resource allocation by simultaneously allocating different channels to multiple terminals and can increase a total system capacity through the improved fairness and efficiency.

The above and other objects of the present invention can be achieved by a transmission method for a communication system with a base station for transmitting a signal using two transmit antennas and a plurality of mobile stations for receiving the signal using two receive antennas, including receiving feedback information which includes channel-by-channel transmission rates from the plurality of mobile stations; comparing transmission rates of identical channels received from the plurality of mobile stations; allocating an associated channel to a mobile station with a largest transmission rate; and transmitting a signal through the allocated channel.

BRIEF DESCRIPTION OF THE DRAWINGS

The above and other objects and aspects of the present invention will be more clearly understood from the following detailed description taken in conjunction with the accompanying drawings, in which.

DETAILED DESCRIPTION OF THE PREFERRED EMBODIMENTS

Figure 1:
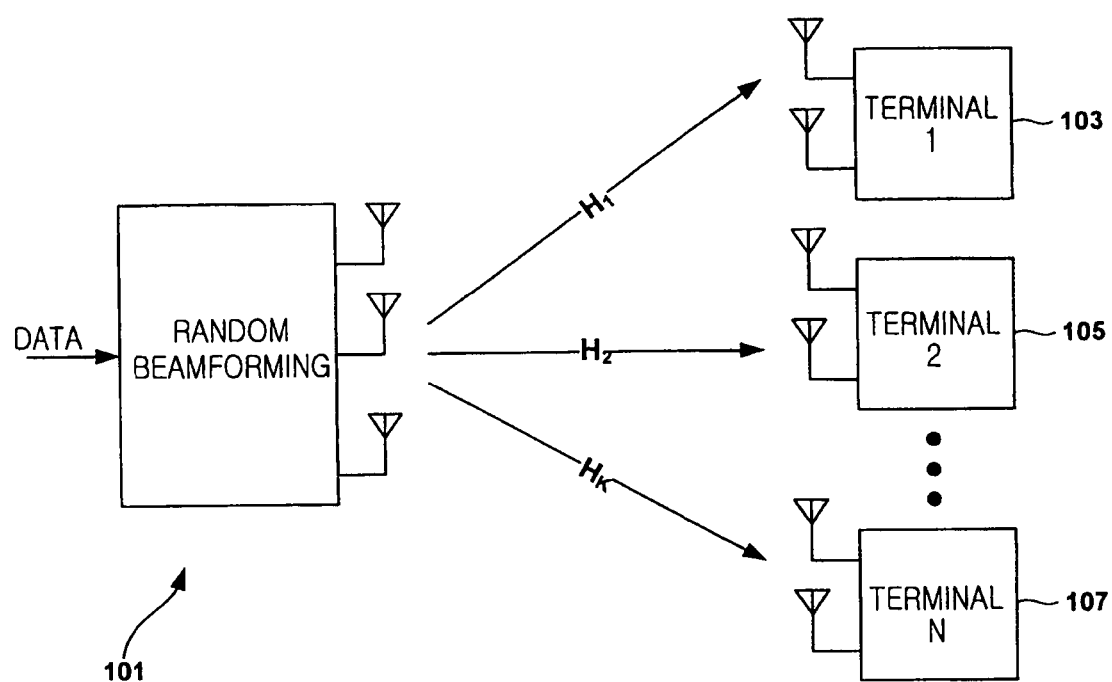
FIG. 1 schematically illustrates a communication system to which a multi-antenna random beamforming technique is applied.

A random beamforming method in accordance with the present invention will be described in detail herein below with reference to the accompanying drawings.

For Singular Value Decomposition (SVD) multiplexing, the conventional multi-antenna random beamforming technique exploits multiple receive antennas of a terminal. However, the random beamforming method of the present invention exploits multiple receive antennas for interference cancellation through interference signal nulling.

In the random beamforming method of the present invention, a base station generates an arbitrary weight vector $V_0$, and transmits a signal $V_0 x$ obtained by multiplying $V_0$ by a vector x constructed by information bits.

Assuming that a terminal exactly knows a channel matrix $H_k$, a k-th terminal receives a signal through a channel based on $H_k$. Thus, the terminal computes a Minimum Mean-Square Error (MMSE) filter of the channel matrix $H_k$ expressed as shown in Equation (4).

$$G_k = \left((H_k V_0)^H (H_k V_0) + \frac{N_0}{E_s} I\right)^{-1} (H_k V_0)^H \qquad (4)$$

When the MMSE filter is computed, the terminal multiplies the received signal by the MMSE filter, thereby detecting a transmitted signal. The detected transmitted signal is expressed as shown in Equation (5).

$$r_k = G_k(H_k V_0 x + n_k) \qquad (5)$$
$$= A_k x + G_k n_k$$

In Equation (5), $A_k = G_k H_k V_0$.

In this case, the maximum Signal to Interference plus Noise Ratio (SINR) can be derived from the received signal obtained through MMSE nulling.

The terminal computes an SINR of each data symbol, computes a transmission rate of each channel from the computed SINR, and transmits a value of the computed transmission rate as limited feedback information to the base station.

The SINR $\Gamma_{k_1}$ of a first symbol $x_1$ computed in a k-th terminal is expressed as shown in Equation (6) (where the number of receive antennas is two).

$$\Gamma_{k_1} = \frac{|[A_k]_{11}|^2 E_s}{|[A_k]_{12}|^2 E_s + (|[G_k]_{11}|^2 + |[G_k]_{12}|^2)N_0} \quad (6)$$

In Equation (6), $A_k = G_k H_k V_0$.

Feedback information transmitted from each terminal to the base station is a transmission rate at which transmission is possible according to each independent channel. When two antennas are used, feedback information of the respective antennas is defined as shown in Equations (7) and (8).

$$C_{k_1} = \log_2(1+\Gamma_{k_1}) \quad (7)$$

$$C_{k_2} = \log_2(1+\Gamma_{k_2}) \quad (8)$$

The base station allocates an i-th channel of a plurality of independent channels to an $$\underset{k_i}{\operatorname{argmax}}\{C_{k_1}\}\text{-}th$$

terminal. As described above, a sum of all transmission rates can be expressed as shown in Equation (9) when the channels are independently allocated.

$$C_{sum-rate} = \max_k\{C_{k_1}\} + \max_k\{C_{k_2}\} + \ldots \quad (9)$$

In accordance with the present invention, the random beamforming method can independently consider spatial channels because self-interference components can be removed.

Figure 2:
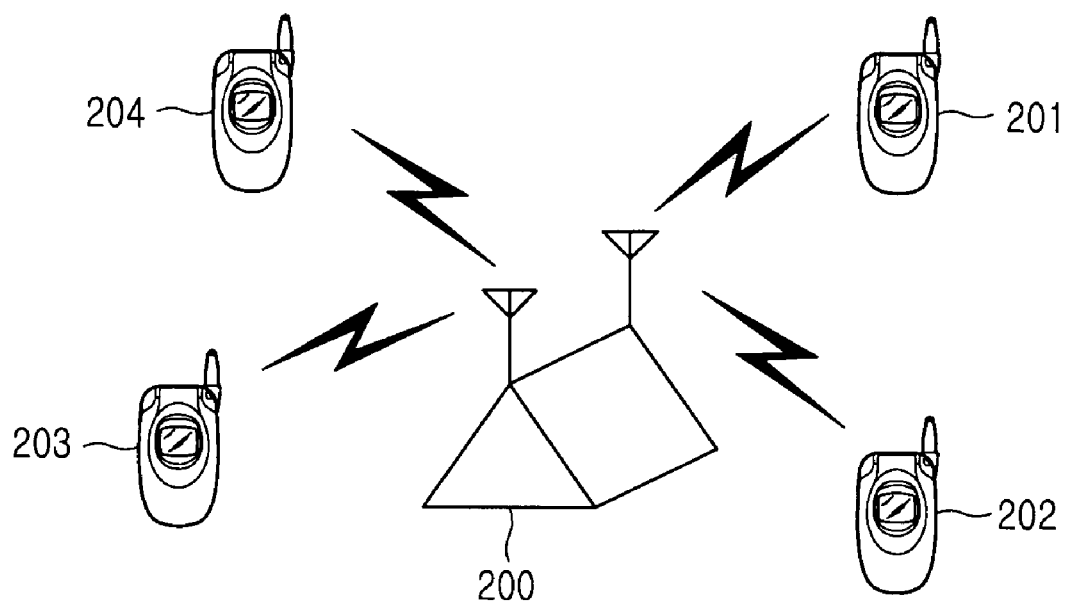
FIG. 2 is a diagram illustrating a channel allocation in a random beamforming method in accordance with the present invention.

FIG. 2 is a diagram illustrating a channel allocation in a random beamforming method in accordance with the present invention. In this embodiment, an example in which each terminal receives a signal using two receive antennas will be described. Two channels allocated to the terminal are classified as a grid-pattern pipe and a dot-pattern pipe. A channel gain is expressed as a pipe thickness. For convenience of explanation, the grid-pattern pipe is referred to as the first channel and the dot-pattern pipe is referred to as the second channel.

In FIG. 2, a base station 200 can detect that a sum of gains of the first and second channels for a first terminal 201 among first to fourth terminals 201, 202, 203, and 204 is largest. When the channel allocation is performed according to the conventional multi-antenna random beamforming technique, both of the two channels are allocated to the first terminal. However, when only gain values of the second channels are compared, it can be seen that the second-channel gain value of the second terminal 202 is larger than that of the first terminal 201.

Because an associated channel is allocated to a terminal with the largest gain for each channel in the random beamforming method of the present invention, the first channel is allocated to the first terminal and the second channel is allocated to the second terminal. The random beamforming method compares channel-by-channel gains of the terminals, and allocates an associated channel to a terminal with the largest gain, thereby efficiently allocating resources.

Figure 3:
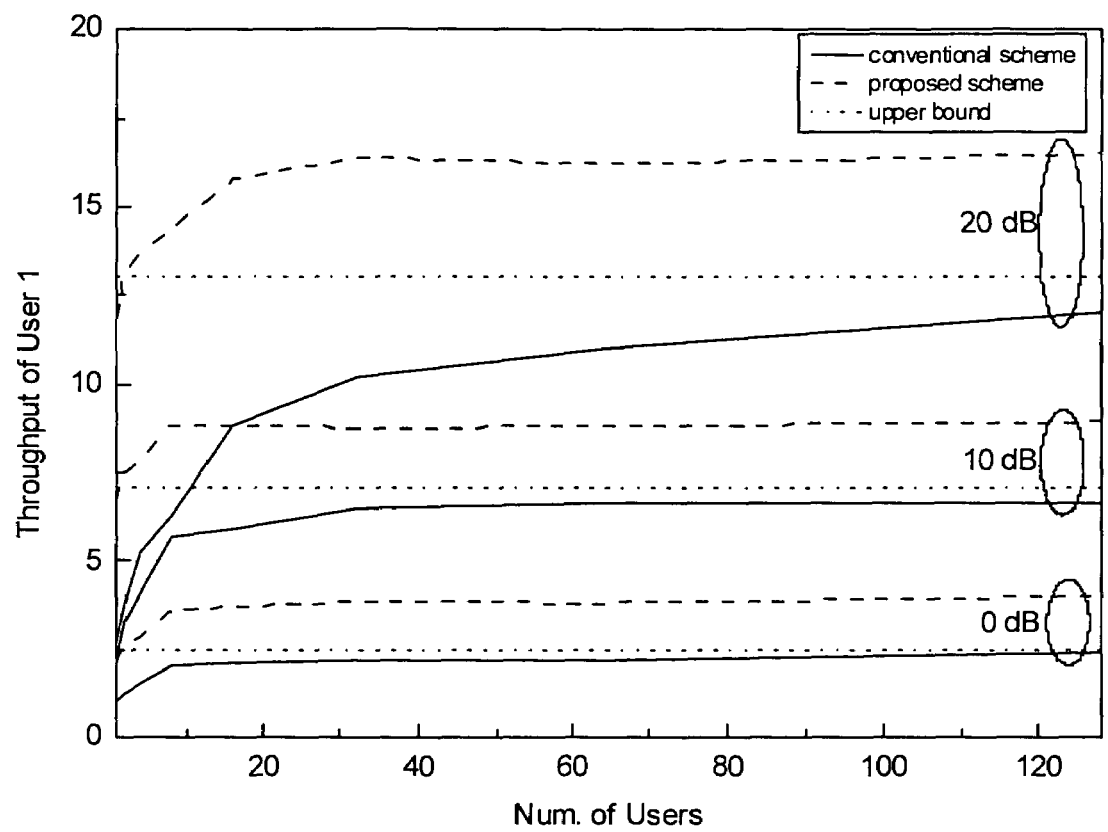
FIG. 3 is a graph illustrating throughput simulation results between the random beamforming method of the present invention and a conventional random beamforming method.

FIG. 3 is a graph illustrating throughput simulation results between the random beamforming method of the present invention and the conventional random beamforming method. Specifically, FIG. 3 illustrates throughput curves of a specific terminal with respect to the number of users when average received Signal-to-Noise Ratios (SNRs) are 0 dB, 10 dB, and 20 dB. The throughput curve of the random beamforming method based on the conventional SVD multiplexing is indicated by the solid line, and the throughput curve of the proposed random beamforming method is indicated by the dashed line. The dotted line indicates the throughput upper bound of the random beamforming method based on SVD multiplexing under an assumption that a transmitting side exactly knows the channels.

As illustrated in FIG. 3, it can be seen that throughput is improved as the number of users increases. This is because characteristics of the random beamforming technology become close to those of a closed loop, as the number of users becomes larger. Moreover, it can be seen that the throughput curve of the proposed random beamforming technique is higher than the upper bound of the random beamforming method based on the conventional SVD multiplexing. This is because the proposed random beamforming method has a higher degree of freedom than the conventional random beamforming method for allocating all available channels to one terminal.

Next, a throughput difference according to an SNR will be described. Because noise increases at a low SNR, the effect of self-interference is relatively small. It can be seen that a throughput difference between the conventional random beamforming method and the proposed random beamforming method is not large, but the proposed random beamforming method based on interference nulling outperforms the conventional random beamforming method as an SNR increases.

Figure 4:
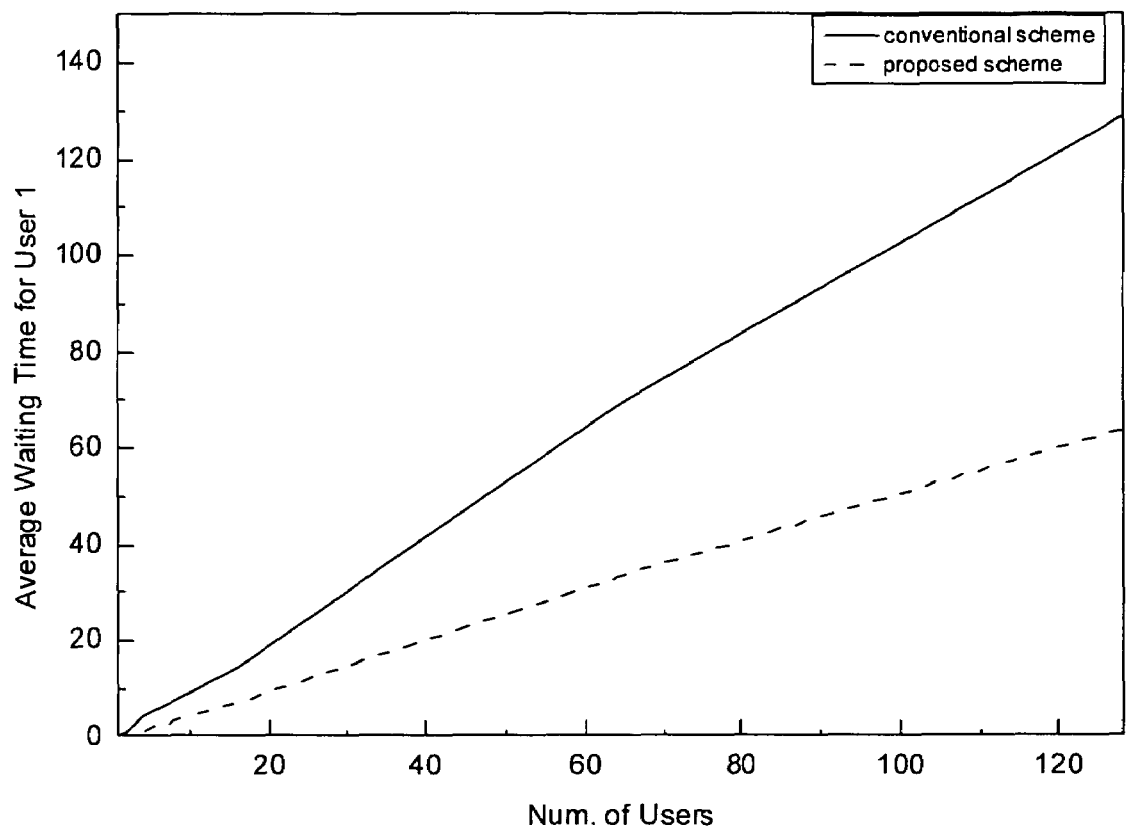
FIG. 4 is a graph illustrating average waiting times of a specific terminal in the random beamforming method of the present invention and the conventional random beamforming method.

FIG. 4 is a graph illustrating average waiting times of a specific terminal in the random beamforming method of the present invention and the conventional random beamforming method. For simulation, a base station with two antennas allocated channels to terminals using two receive antennas has through a proportional fairness scheduling algorithm in a slow fading environment. In FIG. 4, the solid line indicates an average waiting time curve of the conventional beamforming method and the dashed line indicates an average waiting time curve of the proposed beamforming method.

As illustrated in FIG. 4, it can be seen that the average waiting time of the proposed random beamforming method is reduced by approximately ½ of the average waiting time of the conventional random beamforming method. In the proposed random beamforming method, the average waiting time is reduced to 1/n when the number of antennas of the terminal, n, increases. Because the proposed random beamforming method fairly allocates resources to many terminals and reduces a waiting time even when data is not simultaneously transmitted at a high transmission rate, fairness for the terminals can increase and Quality of Service (QoS) can be guaranteed. In other words, the proposed random beamforming method improves both efficiency and fairness in terms of the overall system.

Figure 5:
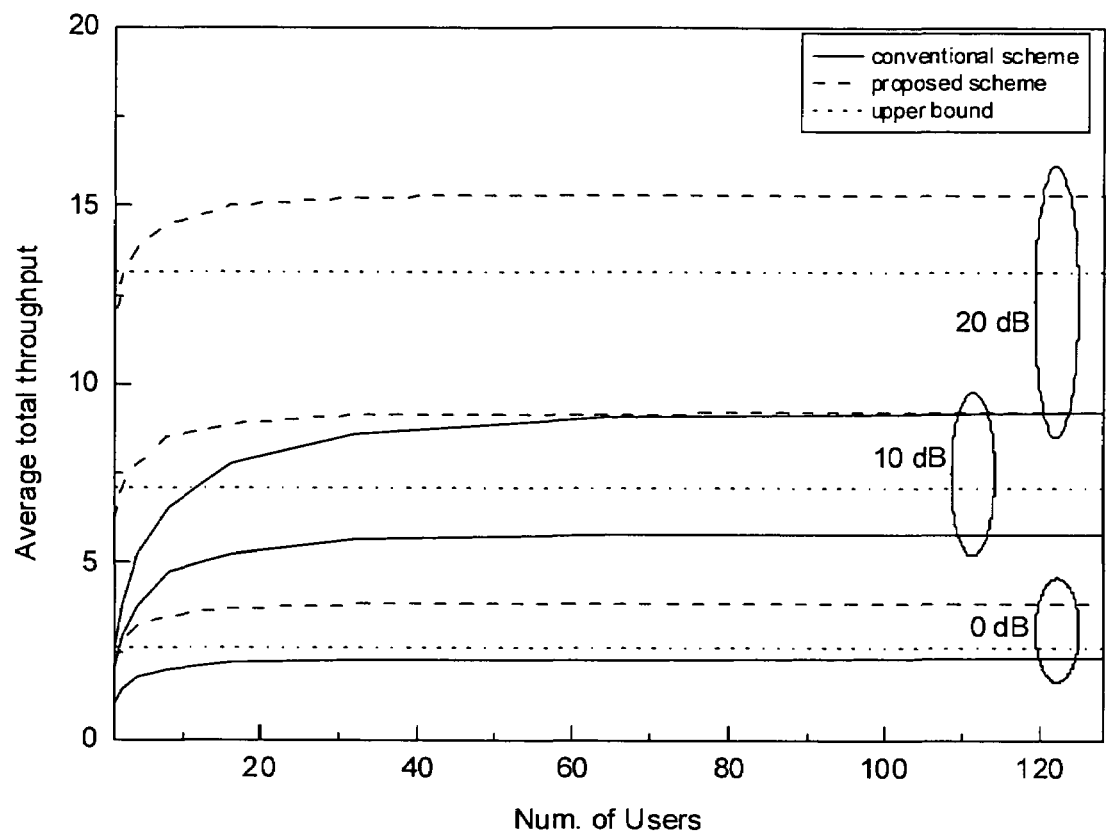
FIG. 5 is a graph illustrating average throughput comparison results between all terminals when the random beamforming method of the present invention and the conventional random beamforming method are applied.

FIG. 5 is a graph illustrating average throughput comparison results between all terminals when the random beamforming method of the present invention and the conventional random beamforming method are applied. The results illustrated in FIG. 5 are similar to those illustrated in FIG. 3.

As described above, the random beamforming method of the present invention removes the effect of self-interference occurring at the time of using the conventional random beamforming method through an MMSE filter, thereby improving the reliability of signal detection.

Moreover, the random beamforming method of the present invention can improve fairness and efficiency of a resource allocation by simultaneously allocating different channels to multiple terminals and can increase a total system capacity through the improved fairness and efficiency.

What is claimed is:

1. A transmission method based on random beamforming in a communication system with a base station for transmitting a signal using at least two transmit antennas, and a plurality of mobile stations for receiving the signal using at least two receive antennas, the method comprising the steps of:

receiving information about channel-by-channel transmission rates from the plurality of mobile stations;

allocating resources of different channels to at least two mobile stations on a basis of the received transmission rates during a unit time; and transmitting a signal through allocated channel resources based on random beamforming, wherein random beamforming is a transmission scheme in which multi-user diversity and scheduling are combined, and wherein the transmission rates are computed using a Signal to Interference plus Noise Ratio (SINR), and the SINR is computed using a parameter representing a Minimum Mean-Square Error (MMSE) filter of each of the mobile stations, and a weight vector, arbitrarily generated from the base station, multiplied by a transmission vector and a channel matrix.

2. The transmission method of claim 1, wherein the transmission rates are computed using Signal to Interference plus Noise Ratios (SINRs) of symbols received from the base station.

3. The transmission method of claim 1, wherein the transmission rates are computed by:

$C_{k_i} = \log_2(1+\Gamma_{k_i})$, where $\Gamma_{k_i}$ is a Signal to Interference plus Noise Ratio (SINR) of a symbol x received by a k-th mobile station through an i-th channel.

4. The transmission method of claim 1, wherein the step of allocating the resources comprises:

comparing the transmission rates of each of channels in feedback information received from the plurality of mobile stations; and allocating associated channel resources to a mobile station with a largest transmission rate.

5. A transmission method based on random beamforming in a communication system with a base station for transmitting a signal using two transmit antennas and a plurality of mobile stations for receiving the signal using two receive antennas, the method comprising the steps of:

receiving feedback information comprising channel-by-channel transmission rates from the plurality of mobile stations;

comparing transmission rates of each channel received from the plurality of mobile stations;

allocating an associated channel to a mobile station with a largest transmission rate; and transmitting a signal through the allocated channel based on random beamforming, wherein random beamforming is a transmission scheme in which multi-user diversity and scheduling are combined, and wherein the transmission rates are computed using a Signal to Interference plus Noise Ratio (SINR), and the SINR is computed using a parameter representing a Minimum Mean-Square Error (MMSE) filter of each of the mobile stations, and a weight vector, arbitrarily generated from the base station, multiplied by a transmission vector and a channel matrix.

6. The transmission method of claim 5, wherein the transmission rates are computed by:

$C_{k_i} = \log_2(1+\Gamma_{k_i})$, where $\Gamma_{k_i}$ is a Signal to Interference plus Noise Ratio (SINR) of a symbol x received by a k-th mobile station through an i-th channel.

7. The transmission method of claim 6, wherein the SINR is computed by:

$$\Gamma_{k_1} = \frac{|[A_k]_{11}|^2 E_s}{|[A_k]_{12}|^2 E_s + (|[G_k]_{11}|^2 + |[G_k]_{12}|^2) N_0},$$

where $A_k = G_k H_k V_O$, $G_k$ is a parameter representing a Minimum Mean-Square Error (MMSE) filter of a k-th mobile station, $$G_k = \left((H_k V_0)^H (H_k V_0) + \frac{N_0}{E_s} I\right)^{-1} (H_k V_0)^H,$$

$V_O$ is a weight vector, arbitrarily generated from the base station, multiplied by a transmission vector x, and $H_k$ is a channel matrix. $E_s$, is the average symbol energy of x and $N_O$ is the noise spectral density.

* * * * *